(12) United States Patent
Oroskar et al.

(10) Patent No.: US 9,706,561 B1
(45) Date of Patent: Jul. 11, 2017

(54) METHOD AND SYSTEM FOR MANAGING QUANTITY OF CARRIERS IN AIR INTERFACE CONNECTION BASED ON PUBLIC LAND MOBILE NETWORK TO WHICH A USER EQUIPMENT DEVICE SUBSCRIBES

(71) Applicant: Sprint Spectrum L.P., Overland Park, KS (US)

(72) Inventors: Siddharth S. Oroskar, Overland Park, KS (US); Jasinder P. Singh, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 84 days.

(21) Appl. No.: 14/834,797

(22) Filed: Aug. 25, 2015

(51) Int. Cl.
| | | |
|---|---|---|
| *H04W 4/00* | (2009.01) | |
| *H04W 72/08* | (2009.01) | |
| *H04L 5/00* | (2006.01) | |
| *H04W 84/04* | (2009.01) | |
| *H04W 88/08* | (2009.01) | |

(52) U.S. Cl.
CPC ........... *H04W 72/085* (2013.01); *H04L 5/001* (2013.01); *H04W 84/042* (2013.01); *H04W 88/08* (2013.01)

(58) Field of Classification Search
CPC . H04W 72/085; H04W 84/042; H04W 88/08; H04L 5/001
USPC ....................................... 455/452.2
See application file for complete search history.

(56) References Cited

U.S. PATENT DOCUMENTS

| | | | |
|---|---|---|---|
| 2004/0224684 A1* | 11/2004 | Dorsey | H04W 48/16 455/434 |
| 2009/0196196 A1* | 8/2009 | Ghosh | H04L 5/0044 370/252 |
| 2014/0023016 A1* | 1/2014 | Mildh | H04L 5/0096 370/329 |
| 2015/0036648 A1* | 2/2015 | Li | H04L 5/001 370/329 |

* cited by examiner

*Primary Examiner* — William Nealon (57) ABSTRACT

Disclosed herein is a method and a corresponding system for managing quantity of carriers, based at least in part on consideration of a public land mobile network (PLMN) to which the user equipment device (UE) at issue subscribes. A base station serving the UE may determine the PLMN to which the UE subscribes and, based at least on the UE's PLMN, may determine a quantity of carriers on which to serve the UE, the determined quantity of carriers being at least one carrier. The base station may then configure an air interface between the base station and the UE to encompass the determined quantity of carriers, so that the base station is then set to serve the UE on the determined quantity of carriers.

20 Claims, 4 Drawing Sheets

METHOD AND SYSTEM FOR MANAGING QUANTITY OF CARRIERS IN AIR INTERFACE CONNECTION BASED ON PUBLIC LAND MOBILE NETWORK TO WHICH A USER EQUIPMENT DEVICE SUBSCRIBES

BACKGROUND

In wireless communication systems, wireless service providers may operate radio access networks (RANs), each RAN including a number of base stations radiating to provide coverage in which to serve user equipment devices (UEs) such as cell phones, tablet computers, tracking devices, embedded wireless modules, and other wirelessly equipped communication devices. In turn, each base station may be coupled with network infrastructure that provides connectivity with one or more transport networks, such as the public switched telephone network (PSTN) and/or the Internet for instance. With this arrangement, a UE within coverage of the RAN may engage in air interface communication with a base station and may thereby communicate via the base station with various remote network entities or with other UEs served by the base station.

Further, a RAN may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In general, a wireless service provider may operate one or more such RANs as a public land mobile network (PLMN) for serving UEs that subscribe to service of the provider. For example, a service provider may operate a CDMA PLMN and may provide UEs with subscriptions that allow the UEs to receive CDMA service from that PLMN. As another example, a service provider may operate an LTE RAN as a PLMN and may provide UEs with subscriptions that allow the UEs to receive LTE service from that PLMN. And as another example, a service provider may operate both a CDMA PLMN and an LTE PLMN and may provide UEs with subscriptions that allow the UEs to receive both CDMA service from the CDMA PLMN and LTE service from the LTE PLMN.

A RAN operating as a PLMN may have an associated PLMN identifier (PLMN ID), and base stations of the RAN may be arranged to broadcast that PLMN ID to indicate that the base stations are part of that PLMN. UEs that subscribe to service of a wireless service provider's PLMN may then be provisioned with data indicating the PLMN ID of the PLMN and with logic that causes the UEs to prefer service by base stations broadcasting that PLMN ID. Further, UEs that subscribe to service of multiple PLMNs, such as both an LTE PLMN and a CDMA PLMN may be provisioned with data indicating the PLMN IDs of each such PLMN and with logic that causes the UEs to prefer service by base stations broadcasting one or more of those PLMN IDs.

Still further, a wireless service provider may allow one or more of its PLMNs to serve UEs that subscribe to service of other PLMNs, pursuant to a roaming agreement. In particular, a first service provider providing a first PLMN may enter into a roaming agreement with a second service provider providing a second PLMN, according to which the first PLMN will serve UEs that subscribe to the second PLMN, and the second service provider will compensate the first service provider for providing that service. As such, a UE that subscribes to service of the second PLMN but that is not within sufficient coverage of the second PLMN may instead opt to be served by the first PLMN.

In practice, a base station may be configured to provide service on multiple carrier frequencies or "carriers." In particular, the air interface between the base station and served UEs on both the downlink and the uplink may span a particular frequency bandwidth (such as 1.4 MHz, 3 MHz, 5 MHz, 10 MHz, or 20 MHz) that may be divided primarily into subcarriers (e.g., subcarriers spaced apart from each other by 15 kHz). Further, the base station may support one or more frequency bands, such as the 800 MHz band (one or more frequency ranges around 800 MHz), the 1.9 GHz band (one or more frequency ranges around 1.9 GHz), and the 2.5 GHz band (one or more frequency ranges around 2.5 GHz), and may provide service on one or more carriers that reside in each supported band. In a frequency division duplex (FDD) arrangement, different carriers are used for the downlink than the uplink. Whereas, in a time division duplex (TDD) arrangement, the same carrier is used for the downlink and uplink and is allocated over time among downlink and uplink communications.

Each carrier may define various logical channels to facilitate communication between the base station and one or more served UEs. For instance, on the downlink, a carrier may define a reference channel on which the base station broadcasts a reference signal useable by UEs to detect and evaluate coverage, various other downlink control channels to carry control signaling (such as resource-scheduling directives) to UEs, and one or more shared or traffic channels for carrying bearer data (e.g., user or application level data) to UEs. And on the uplink, a carrier may define one or more uplink control channels to carry control signaling (such as resource scheduling requests, channel state reports, and the like) from UEs, and one or more shared or traffic channels for carrying bearer data from UEs.

When a UE enters into coverage of a base station on a particular carrier, the UE may attach or register with the base station on that carrier, and the base station may then serve the UE on that carrier. Further, under certain air interface protocols, a base station may be able to serve a UE concurrently on multiple carriers, to help increase the effective bandwidth and associated throughput available to the UE. For instance, if a UE is attached with a base station on a first carrier, the base station may then add a second carrier to its service of the UE so as to then provide the UE with "carrier aggregation" service on a combination of the first carrier and the second carrier. In that arrangement, the first carrier may be considered the UE's primary carrier or primary cell (PCell), and the second carrier may be considered the UE's secondary carrier or secondary cell (SCell). Depending on the carrier aggregation implementation, the SCell might be used principally for downlink communication (to increase the UE's downlink throughput) rather than for uplink communication, and the PCell may carry some or all control signaling related to the SCell (in addition to control signaling related to the PCell).

OVERVIEW

Although serving a UE on multiple carriers concurrently can help improve throughput for the UE, doing so also necessarily makes use of more radio frequency spectrum than serving the UE on just one of the carriers at a time. In practice, the operator of a wireless communication system may have only a limited extent of radio frequency spectrum, such as a limited number of licensed carriers, available for use to serve UEs in a given market. Providing UEs with carrier aggregation service in such a system may thus consume more of that limited radio frequency spectrum than providing UEs with service on just one carrier at a time and may thereby leave less of the spectrum available to serve other UEs. Further, the more carriers the operator aggregates together for concurrent use to serve a UE, the more significant this issue may become.

Consequently, it would be desirable to manage use of carriers, particularly to manage the number of carriers on which a base station provides service to a UE. Disclosed herein is a method and system for doing so, based at least in part on consideration of the PLMN to which the UE subscribes. In particular, the disclosure provides for determining the PLMN to which the UE subscribes and, based at least on the determined PLMN, determining a non-zero quantity of carriers on which to serve the UE. The disclosure then provides for using the determined quantity of carriers as a basis for configuring an air interface between the base station and the UE to encompass the determined quantity of carriers, such as by adding or removing one or more carriers to cause the air interface to encompass the determined quantity of carriers. In this manner, the RAN may operate to use more carriers for serving a UE subscribed to one PLMN than for serving a UE subscribed to another, different PLMN.

Accordingly, in one respect, disclosed herein is a method for managing carriers while a base station is serving a UE. As disclosed, the method involves making a first determination of a PLMN to which the UE subscribes (e.g., the PLMN ID). Further, the method involves, based at least in part on the first determination of the PLMN to which the UE subscribes, making a second determination of a quantity of carriers on which to serve the UE, the determined quantity of carriers being at least one carrier. And the method involves, based on the second determination, configuring an air interface between the base station and the UE to encompass the determined quantity of carriers, so that the base station is then set to serve the UE on the determined quantity of carriers.

Given the determined PLMN of the UE, the base station may take into account various PLMN-based distinctions to determine the quantity of carriers on which to serve the UE. By way of example, the base station may use the UE's PLMN as a basis for determining whether the UE is a home UE of the base station or a roaming UE of the base station. To facilitate this in practice, in line with the discussion above, the base station may receive the PLMN ID of the UE and then compare the UE's PLMN ID with the base station's PLMN ID to determine whether the base station's PLMN corresponds with the UE's PLMN. If the UE subscribes to service of a PLMN provided by the service provider of base station, the base station may determine that the base station's PLMN matches the UE's PLMN, and may thus consider the UE to be a "home UE" of the base station. On the other hand, if the UE does not subscribe to a PLMN provided by the service provider of the base station, such as if the UE subscribes to another service provider having a roaming agreement with the base station's service provider, the base station may determine that the base station's PLMN does not match the UE's PLMN, and may thus consider the UE to be a "roaming UE" of the base station. Based on this analysis of whether the UE is a home UE or a roaming UE, the base station may determine the quantity of carriers on which to serve the UE.

Accordingly, in another respect, disclosed is a method operable by a base station while the base station is serving the UE through a radio-link-layer connection between the base station and the UE. According to the method, the base station makes a first determination of a PLMN to which the UE subscribes. Further, based at least in part on the first determination, the base station makes a second determination of whether the base station corresponds with the determined PLMN to which the UE subscribes. Then, based at least in part on the second determination, the base station makes a third determination of a quantity of carriers on which to serve the UE, the quantity of carriers being at least one carrier. In turn, based on the third determination, the base station then configures the radio-link-layer connection between the base station and the UE to encompass the determined quantity of carriers, so that the base station is then set to serve the UE on the determined quantity of carriers.

Still further, in another respect, disclosed is a base station comprising an antenna structure and further comprising a controller configured to carry out some or all of the operations noted above while the base station is serving a UE over an air interface connection between the base station and the UE. For instance, the operations may include (i) making a first determination of a PLMN to which the UE subscribes, (ii) based at least in part on the first determination of the PLMN to which the UE subscribes, making a second determination of a quantity of multiple carriers on which to serve the UE, and (iii) based on the second determination, configuring the air interface connection to encompass the determined quantity of multiple carriers, so that the base station then provides carrier aggregation service concurrently on the determined quantity of multiple carriers.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Further, the present method will be described herein as performed by a base station, namely an LTE eNodeB. However, it will be understood that the present method may be performed in whole or in part by one or more other RAN entities, such as a network controller (e.g., a mobility management entity (MME) of an LTE RAN, or a base station controller (BSC) of a CDMA RAN), and may be performed by such RAN entities in conjunction with each other or in conjunction with a base station.

Still further, the present method will be described herein as performed by a base station while the base station is "serving the UE" at issue. Herein, a base station may be considered to be "serving the UE" at any point in time when the UE and the base station have an established a client-server relationship with each other and/or are in the process of establishing such a relationship (e.g., during an LTE random access process in which the UE transmits to the base station on an uplink random access channel (RACH) a randomly-selected preamble to notify the base station that the UE is trying to gain access and the base station then responds by transmitting to the UE a temporary identifier and an initial assignment of physical uplink shared channel (PUSCH) resources). As such, any communications transmitted from the UE to the base station and/or any communications transmitted from the base station to the UE may be considered to be communications between the base station and the UE while the base station is "serving the UE."

And still further, the description of the present method herein will be focused on the PLMN-based distinction of whether the UE at issue is a home UE or a roaming UE, and then using that distinction as a basis for determining the quantity of carriers on which to serve the UE, as discussed above. However, it will be understood that the base station may take into account other possible PLMN-based distinctions to determine the quantity of carriers on which to serve the UE, in addition to or instead of taking into account whether the UE is home or roaming.

Figure 1:
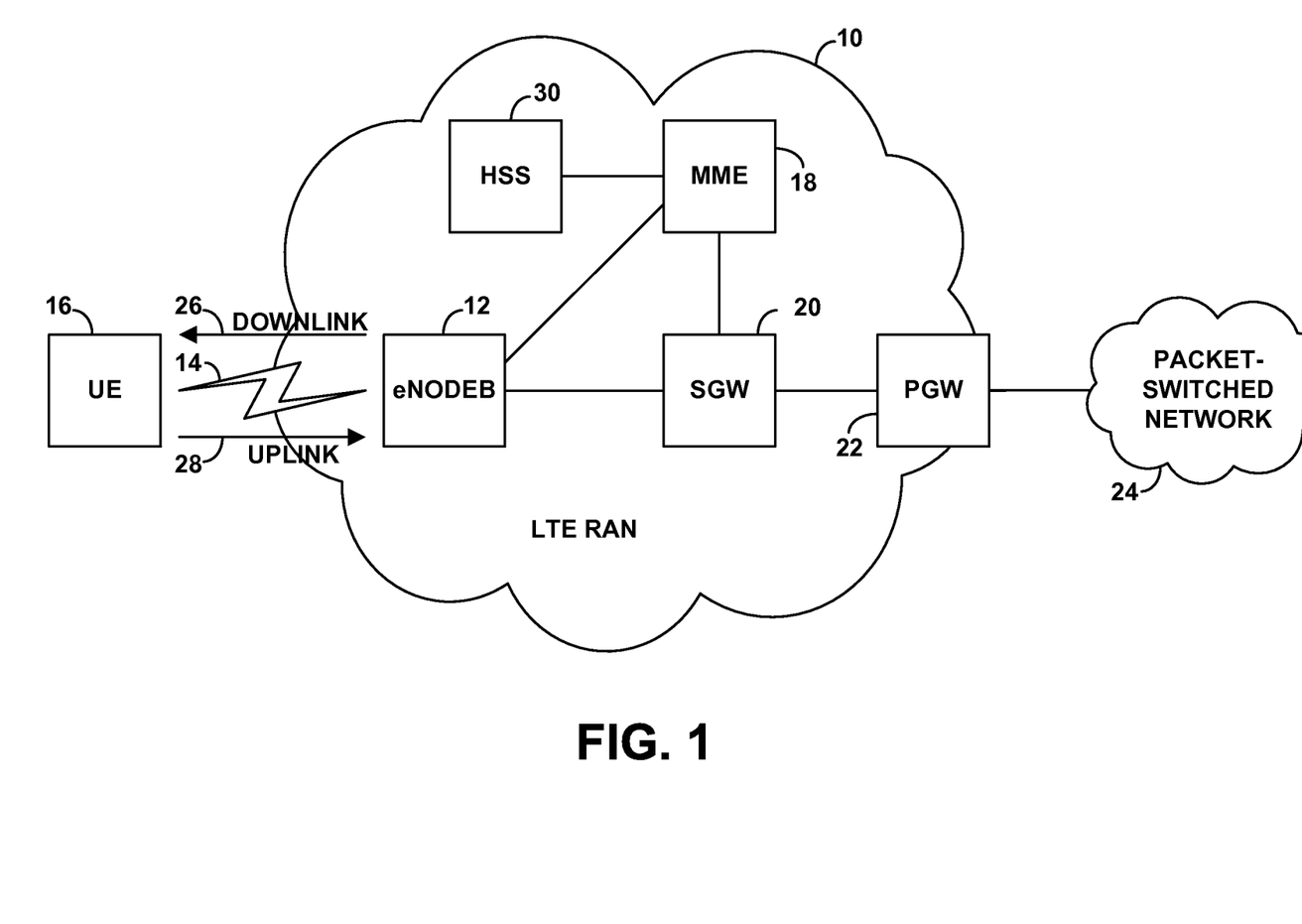
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE RAN 10, which functions primarily to serve UEs with wireless packet data communication service, including possibly voice-over-packet service, but may also provide other functions. As shown, the LTE RAN includes a base station (eNodeB) 12, which has an antenna structure and associated equipment for providing an LTE coverage area 14 in which to serve UEs such as an example UE 16 as shown. The eNodeB 12 then has a communication interface with an MME 18 that functions as a signaling controller for the LTE RAN, and the MME is in turn shown having a communication interface with a home subscriber server (HSS) 30. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20. In practice, the illustrated components of the LTE RAN may sit as nodes on a private packet-switched network owned by an operator of the LTE RAN, and thus the various communication interfaces may be logical interfaces through that network.

As illustrated, the air interface of coverage area 14 defines a downlink direction 26 from the eNodeB to the UE and an uplink direction 28 from the UE to the eNodeB. Further, the eNodeB and UE may be configured (e.g., licensed and programmed) to support air interface communication on one or more particular carriers, each of which may be FDD or TDD. Each such carrier and/or its particular downlink and uplink channels may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect a reference signal broadcast from eNodeB 12 on a particular carrier, and the UE may responsively engage in an attach process or handover process to register with the LTE RAN on that carrier. For instance, the UE may initially transmit to eNodeB 23 an attach message, and upon receipt of the attach message, eNodeB 12 may forward the attach message to the MME 18, and the MME may then engage in signaling with the HSS 30 and perhaps further signaling with the UE, to authorize and authenticate the UE, and may obtain from the HSS various service profile information (i.e., a profile record) for the UE for storage as a local context record for the UE at the MME, the eNodeB, and/or other LTE network elements. The MME may then engage in signaling with the SGW 20 and the eNodeB 12, and the SGW may engage in signaling with the PGW 22. Through all of this signaling and/or subsequently, the MME may coordinate establishment for the UE of one or more bearers extending between the UE and the PGW, each including a radio-bearer portion between the UE and the eNodeB 12 and an access-bearer portion between the eNodeB 12 and the PGW (via the SGW).

Further, the UE may engage in signaling with the eNodeB to establish a radio-link-layer connection (i.e., air interface connection) on the detected carrier, so that the eNodeB may then serve the UE on that carrier. For instance, the UE and eNodeB may exchange RRC configuration messaging in order to prepare the eNodeB to serve the UE on the carrier and to prepare the UE to be served on the carrier. In this or another process (e.g., as part of the attachment process), the eNodeB may store a context record for the UE, indicating that the eNodeB is serving the UE on the particular carrier, so that the eNodeB may then serve the UE on the indicated carrier (e.g., then exchanging control signaling and bearer traffic with the UE on and/or for that carrier) per that context record. Further, the UE may store a context record indicating that the UE is being served on that carrier, so that the UE can then be served on that carrier (e.g., then exchanging control signaling and bearer traffic with the eNodeB on and/or for that carrier) per that context record. As such, the radio-link-layer connection could be considered to effectively encompass initially just that one carrier. In practice, the radio-link-layer connection between the eNodeB and the UE may "encompass" a given carrier when the given carrier is a carrier on which (i) the eNodeB is set to serve the UE and (ii) the UE is set to be served by the eNodeB. For instance, any carrier that the UE's context record (or other record for the UE) indicates may be a carrier that the radio-link-layer connection between the eNodeB and the UE encompasses.

In addition, while the base station is serving the UE (e.g., during or after the random access process, attach process, or handover process), the eNodeB and UE may engage in RRC configuration messaging and/or other processing to configure or otherwise set the UE's radio-link-layer connection to encompass a different number of carriers. In particular, the eNodeB and UE may arrange the UE's radio-link-layer connection to encompass two or more carriers so as to facilitate carrier aggregation service.

There could be various reasons for doing this. By way of example, the eNodeB may base this on a determination that a single carrier on which the UE would be served, such as the carrier on which the UE initially requested attachment and/or initially attached with or handed off to the eNodeB, is threshold heavily loaded (e.g., that the eNodeB has been scheduling more than a threshold percentage of resources on that carrier, and/or that the eNodeB is serving more than a threshold number of UEs with radio-link-layer connections encompassing that carrier). Or the eNodeB may base this on a determination that the air interface channel conditions between the UE and the eNodeB are threshold good and/or threshold poor (e.g., based on UE-provided channel-quality measurement reports and/or eNodeB evaluation of channel quality). Still further, the eNodeB may base this on a determination that there is a threshold great extent of data buffered for transmission over the air interface between the eNodeB and the UE.

To set or adjust the carriers encompassed by the UE's radio-link-layer connection, the eNodeB may transmit to the UE an RRC connection reconfiguration message that specifies each of the carriers on which the eNodeB will be serving the UE, identifying each carrier by its global identifier for instance. Further, to facilitate carrier aggregation service, the eNodeB may designate one such carrier by a special PCell index and the eNodeB may designate each other carrier by a special SCell index. The eNodeB may then also update its context record for the UE to indicate that the UE's radio-link-layer connection now encompasses the indicated carriers, so that the eNodeB may then engage in communication with the UE on those carriers. And the UE may responsively update its context record to indicate that the UE's radio-link-layer connection now encompasses the indicated carriers, so that the UE will be prepared to engage in communication with the eNodeB on those carriers.

This or another process could be used to add or remove one or more carriers from a UE's radio-link-layer connection. For example, if the connection currently encompasses just one carrier, the process could be used to change the connection to encompass a different carrier and/or to add one or more additional carriers (e.g., as SCells) so as to facilitate carrier aggregation service. As another example, if the connection currently encompasses two or more carriers, the process could be used to add one or more additional carriers to the connection so as to provide increased carrier aggregation, or to remove one or more carriers from the connection so as to provide reduced carrier aggregation or to switch to single-carrier service. Other examples are possible as well.

Furthermore, in line with the discussion above, the UE at issue may subscribe to a PLMN. For instance, a user or owner of the UE may contract with the service provider of a given PLMN to establish a subscription account according to which the service provider will provide the UE with service in exchange for a fee (e.g., pre-paid or post-paid). Accordingly, in the registration or attach signaling processes noted above, or in some other manner, the UE may convey to the eNodeB an indication of the PLMN to which the UE subscribes (e.g., a PLMN ID of the UE's PLMN), and this indication may be stored in the context record for the UE.

As noted above, the present disclosure provides for the eNodeB determining the PLMN to which the UE served by the eNodeB subscribes and using that PLMN as a basis for determining a quantity of carriers that the UE's radio-link-layer connection should encompass. The disclosure then provides for the eNodeB configuring the UE's radio-link-layer connection to encompass the determined quantity of carriers so that that the eNodeB is then set to serve the UE on the determined quantity of carriers. As further noted above, this process could be carried out by the eNodeB itself and/or by one or more other RAN entities, such as with portions of the PLMN analysis carried out by an entity outside of the eNodeB and the eNodeB then responsively working to configure the radio-link-layer connection. For simplicity, however, the process will be described here in a scenario where the eNodeB carries out all aspects of the process. Further, the process could be performed at the time the eNodeB initially establishes the UE's radio-link-layer connection or later as a reconfiguration of an established radio-link-layer connection.

In an example implementation of this process, while the eNodeB is initially serving the UE on just a single carrier, or with carrier aggregation on multiple carriers, the eNodeB may determine the PLMN to which the UE subscribes. To facilitate this in practice, during or after the registration or attach process the eNodeB may receive from the UE or another RAN entity the PLMN ID of the UE (or other indication of the UE's PLMN), which the eNodeB would then presumably store for later reference. In particular, for example, the UE may report its PLMN ID to the eNodeB when it registers or attaches with the eNodeB, or may convey its PLMN ID to the eNodeB or other RAN entity in some other manner, and the eNodeB may store the PLMN ID in the context record for the UE. As another example, during or after the registration or attach process, the eNodeB may receive from the HSS, via the MME, the UE's profile record specifying the PLMN ID and may store the PLMN ID in the context record for the UE. And as another example, the eNodeB may at some point query one or more other RAN entities to obtain and store the UE's PLMN ID. Other examples are possible as well.

Given the determined PLMN, the eNodeB may use the determined PLMN as a basis for determining a quantity of carriers on which to serve the UE, which may be a different quantity than the radio-link-layer connection between the eNodeB and the UE currently encompasses. Based on the determined quantity of carriers, the eNodeB may then configure the radio-link-layer connection between the eNodeB and the UE to encompass the determined quantity of carriers and prepare the eNodeB and UE to communicate with each other on the determined quantity of carriers. For instance, the eNodeB may transmit to the UE an RRC configuration message that specifies the carriers on which the eNodeB will be providing the UE with service, and the eNodeB may update a UE context record at the eNodeB to indicate that the radio-link-layer connection now encompasses the specified carriers. And the eNodeB may then provide the UE with service on the specified quantity of carriers. If the determined quantity of carriers is more than just one carrier, for instance, the eNodeB may then provide the UE with carrier aggregation service concurrently on the specified multiple carriers.

Further, if the eNodeB is serving the UE on one or more carriers and the determined quantity of carriers is just one carrier, the eNodeB may then continue to serve the UE through the radio-link-layer connection on a particular carrier of the one or more carriers. To facilitate this, upon determining the quantity of carriers to be just one carrier, the eNodeB may select a particular carrier of the one or more carriers to be the carrier on which to continue to serve the UE, and then configure the radio-link-layer connection to encompass just the selected carrier (by removing each other carrier from the radio-link-layer connection).

In some implementations of the disclosed process, given the indication of the UE's PLMN as noted above, the eNodeB may determine whether the UE is a home UE of the eNodeB or a roaming UE of the eNodeB, and use this home/roaming distinction as a basis for determining the quantity of carriers on which to serve the UE. However, it will be understood that in some implementations, the eNodeB may not expressly consider descriptors such as "home" or "roaming" with respect to the UE at issue. Rather, the the eNodeB may merely make a distinction between UEs whose PLMN ID corresponds with the eNodeB's PLMN ID (a "home" UE, for instance) and UEs whose PLMN ID does not correspond with the eNodeB's PLMN ID (a "roaming" UE, for instance).

To determine whether the UE is home or roaming, as discussed above, the eNodeB may compare the UE's PLMN ID with the eNodeB's PLMN ID to determine whether the eNodeB's PLMN corresponds with the UE's PLMN. For instance, if the eNodeB determines that the eNodeB's PLMN matches the UE's PLMN, the eNodeB will consider the UE to be a home UE of the eNodeB (such as when the UE subscribes to service provided by the eNodeB's service provider). Whereas, if the eNodeB determines that the eNodeB's PLMN does not match the UE's PLMN, the eNodeB will consider the UE to be a roaming UE of the eNodeB (such as when the UE does not subscribe to service provided by the eNodeB's service provider, and rather subscribes to a different service provider that has a roaming agreement with the eNodeB's service provider).

In turn, based on this analysis of whether the UE is a home UE or a roaming UE (and/or perhaps based on other PLMN-based analyses), the eNodeB may determine the quantity of carriers on which to serve the UE. To facilitate this, the eNodeB may be provisioned with (or otherwise have access to) data that indicates, respectively for home UEs and roaming UEs, a quantity of carriers on which the eNodeB should serve the UE. For example, such data may indicate that the eNodeB should serve a home UE on more than one carrier, but that the eNodeB should serve a roaming UE on just one carrier. As another example, such data may indicate that the eNodeB should serve a home UE on more than two carriers, but that the eNodeB should serve a roaming UE on less than two carriers. Further, the data may also indicate a maximum and/or minimum limit on the respective quantities of carriers on which to serve home and roaming UEs. For example, the eNodeB may be set to serve a home UE concurrently on no more than six carriers, but may be set to serve a roaming UE concurrently on no more than two carriers.

Still further, the eNodeB or other RAN entity may update this data periodically or continuously based on changing conditions in the RAN, particularly changing condition on the eNodeB's carriers. For example, if the eNodeB detects that a threshold extent (e.g., a quantity that exceeds a threshold) of its carriers are highly loaded, the eNodeB may responsively reduce the maximum amount of carriers on which to serve home UEs (e.g., from six to two carriers), and/or reduce (or leave unchanged) the maximum quantity of carriers on which to serve roaming UEs (e.g., from two carriers to one, or leave the maximum as one carrier if the maximum is currently set at one). As another example, if the eNodeB detects that a threshold extent of its carriers are lightly loaded, the eNodeB may responsively increase the maximum quantity of carriers on which to serve home UEs (e.g., from two to six carriers), and/or increase (or leave unchanged) the maximum amount of carriers on which to serve roaming UEs (e.g., from one carrier to three, or leave the maximum as one carrier if the maximum is currently set at one). Other example conditions and corresponding quantities of carriers are possible as well.

Furthermore, in some implementations of the disclosed process, the eNodeB may also use the PLMN of the UE (e.g., home UE vs. roaming UE) as basis for selecting which of the eNodeB's carriers to use for serving the UE with the determined quantity of carriers and/or, in a scenario where the determined quantity is multiple carriers, for selecting which of the eNodeB's carriers to use as a PCell and which to use as one or more SCells. By way of example, if the eNodeB is serving the UE on just one particular carrier and the eNodeB determines that the UE is a home UE, the eNodeB may responsively use the particular carrier as a PCell and select one or more of its other available carriers to add as SCells (or, alternatively, use the particular carrier as an SCell and add a new carrier for use as a PCell). As another example, if the eNodeB is serving the UE on just one particular carrier and the eNodeB determines that the UE is a roaming UE, the eNodeB may responsively determine that the eNodeB should continue to serve the UE on one carrier, and then select a new carrier, different than the particular carrier, on which to serve the UE. Other examples are possible as well.

As noted above, based on the determined quantity of carriers, the eNodeB may configure the radio-link-layer connection to encompass the determined quantity of carriers so that the eNodeB is then set to serve the UE on the determined quantity of carriers. Further, the configuring may be performed based on and/or in response to additional factors as well (i.e., in addition to consideration of the determined PLMN to which the UE subscribes), such as considerations of load and/or of channel conditions as noted above (e.g., based on the amount of data to be transmitted over the air interface between the eNodeB and the UE, the level of load on each of one or more carriers, and/or the UE-reported quality of the air interface connection).

Through this disclosed process, if the UE's radio-link-layer connection does not already encompass the determined quantity of carriers, then the eNodeB may configure the radio-link-layer connection to encompass the determined quantity of carriers. As noted above, the eNodeB may configure the radio-link-layer connection by engaging in RRC configuration messaging with the UE, with the eNodeB and UE updating their context records accordingly, by way of example. Thus, if, at the initiation of this process, the radio-link-layer connection encompasses just one carrier, the eNodeB could modify the radio-link-layer connection by adding one or more carriers to attain the determined quantity. Alternatively, if the radio-link-layer connection initially encompasses a quantity of carriers different than the determined quantity (e.g., if the eNodeB is already set to serve the UE with carrier aggregation), the eNodeB could change the radio-link-layer connection from that initial quantity to the determined quantity, by adding or removing one or more carriers.

In these implementations and in others, the specific carriers that would be aggregated could take various forms and have various bandwidth, and could be contiguous or non-contiguous and inter-band and/or intra-band. For instance, the carriers could each be 20 MHz TDD carriers or other carriers including but not limited to those noted above.

Figure 2:
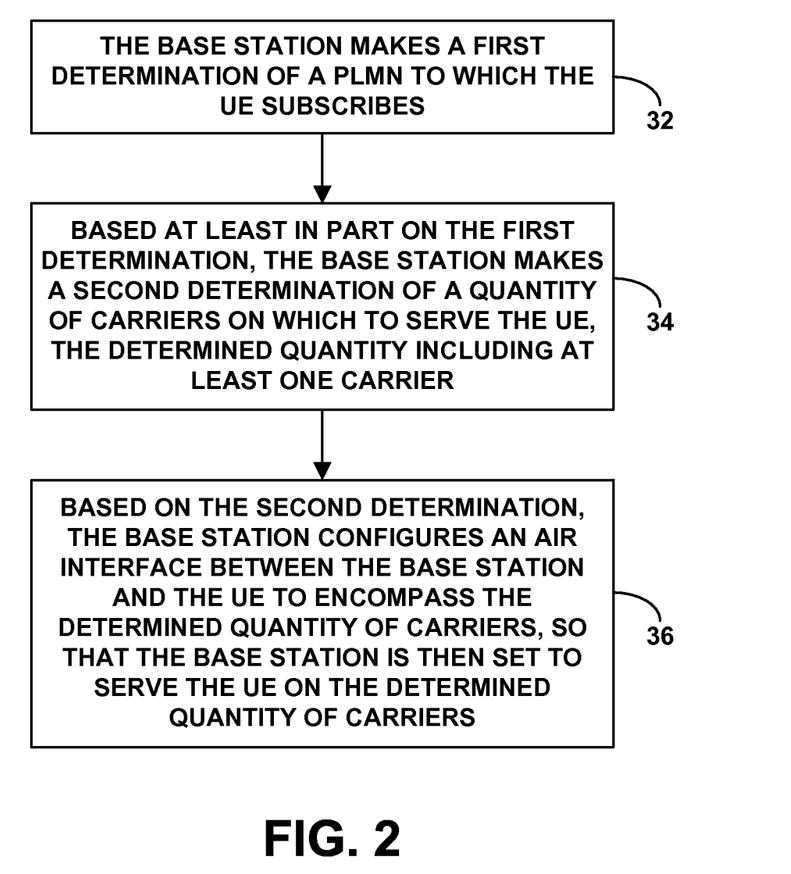
FIG. 2 is a flow chart depicting example operations in accordance with the disclosure.

FIG. 2 is next a flow chart depicting an example set of operations that can be carried out by a base station in an implementation of this process. In an example implementation, the base station performs the illustrated process while the base station is serving a UE. As shown in FIG. 2, at block 32, the method begins with the base station making a first determination of a PLMN to which the UE subscribes. At block 34, based at least in part on the first determination of the PLMN to which the UE subscribes, the base station makes a second determination of a quantity of carriers on which to serve the UE, the determined quantity including at least one carrier. And at block 36, the method then involves, based on the second determination, the base station configuring an air interface (e.g., an established radio-link-layer connection such as an RRC connection) between the base station and the UE to encompass the determined quantity of carriers, so that the base station is then set to serve the UE on the determined quantity of carriers as noted above. Various other features described above could be incorporated into this method as well.

Figure 3:
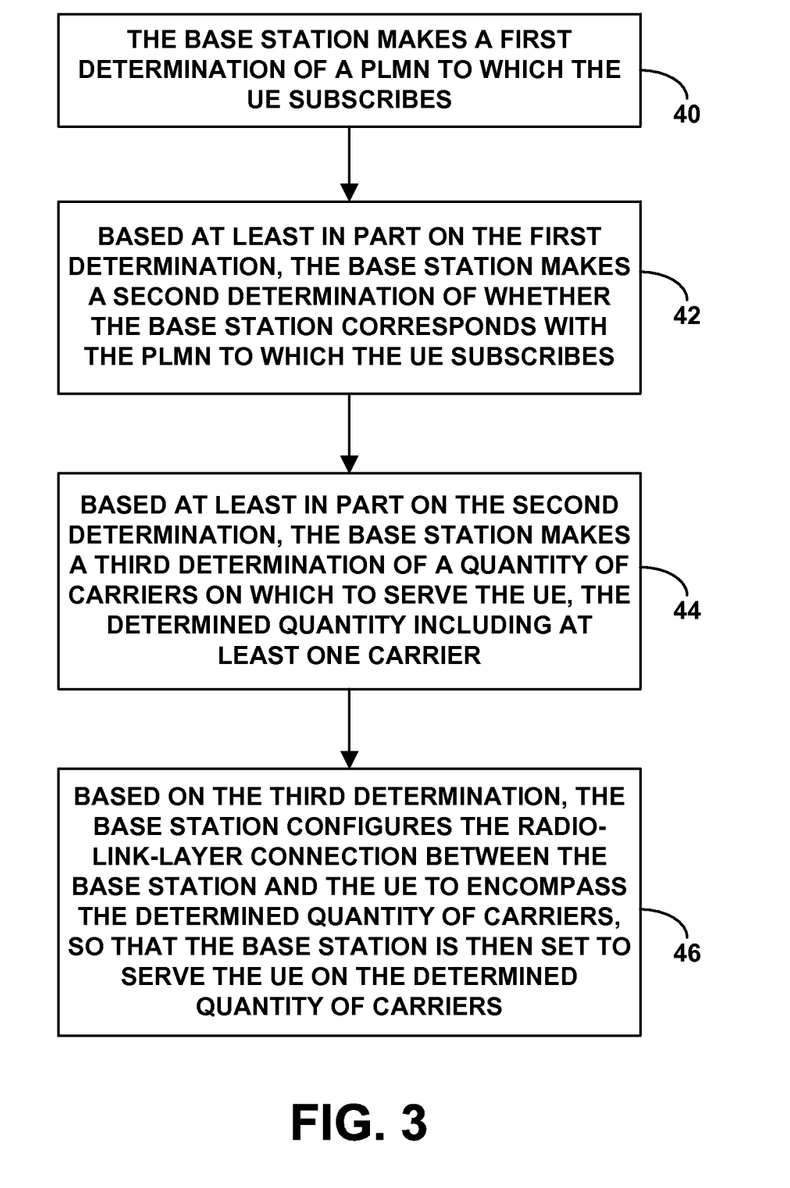
FIG. 3 is another flow chart depicting example operations in accordance with the disclosure.

FIG. 3 is next a flow chart depicting another example set of operations that can be carried out by a base station such as eNodeB 12 in an implementation of this process while the base station is serving a UE through a radio-link-layer connection. As shown in FIG. 3, at block 40, the base station makes a first determination of a PLMN to which the UE subscribes. Further, at block 42, based at least in part on the first determination, the base station makes a second determination of whether the base station corresponds with the determined PLMN to which the UE subscribes (e.g., whether the UE is a home UE or a roaming UE of the base station). And at block 44, based at least in part on the second determination, the base station makes a third determination of a quantity of carriers on which to serve the UE, the determined quantity of carriers including at least one carrier. At block 46, based on the third determination, the base station then configures the radio-link-layer connection between the base station and the UE to encompass the determined quantity of carriers, so that the base station is then set to serve the UE on the determined quantity of carriers as noted above. Various other features described above could be incorporated into this method as well.

As noted above, if the base station determines that the base station corresponds with the determined PLMN to which the UE subscribes, and thus that the UE is a home UE, then, in response to determining that the base station corresponds with the determined PLMN, the base station may determine the quantity of carriers on which to serve the UE to be greater than one carrier. On the other hand, if the base station determines that it does not correspond with the determined PLMN to which the UE subscribes, and thus that the UE is a roaming UE, then, in response to determining that the base station does not correspond with the determined PLMN, the base station may determine the quantity of carriers on which to serve the UE to be just one carrier. It will be understood that the base station may be configured to determine other respective quantities for home and roaming UEs as well.

Furthermore, in line with the discussion above, at least one of the operations depicted in FIG. 2 or FIG. 3 may be performed in response to the base station detecting a trigger condition. By way of example, the base station may detect that the base station is experiencing greater than a threshold extent of load, or is detecting a weak signal strength, on one or more carriers on which the base station is operable to serve UEs, and may responsively engage in the disclosed process with respect to one or more of its served UEs. In this manner, for instance, the base station may allow its home UEs to use more of its available carriers than it allows its roaming UEs to use.

Moreover, although disclosed herein are operations referring to discrete "first," "second," and "third" determinations, in practice the operations could be combined/integrated in various ways and/or performed in some other manner.

Figure 4:
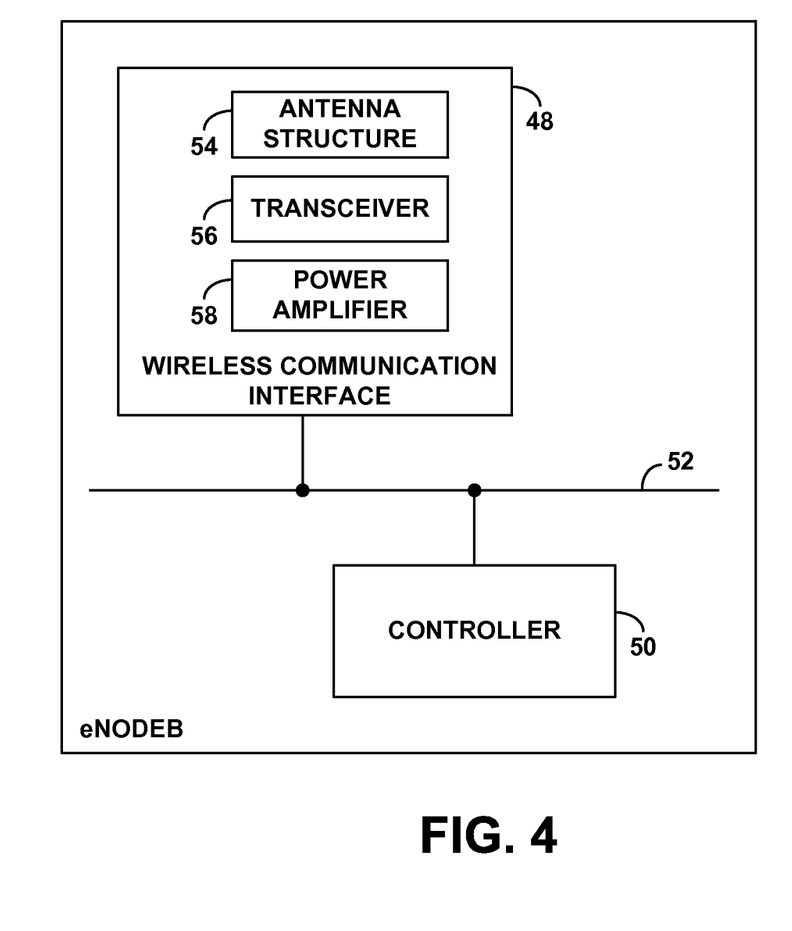
FIG. 4 is a simplified block diagram of an example base station operable in accordance with the disclosure.

Finally, FIG. 4 is a simplified block diagram of a base station, namely an example eNodeB (e.g., macro eNodeB, small cell, or other type of base station), showing some of the components that such a device may include in order to carry out these and other operations discussed above. As shown, the example eNodeB includes a wireless communication interface 48 and a controller 50, all of which could be integrated together in various ways or, as shown, interconnected with each other through a system bus, network, or other connection mechanism 52.

Wireless communication interface 48 includes an antenna structure (e.g., one or more antennas or antenna elements) 54, which could be tower mounted or provided in some other manner, configured to transmit and receive over the air interface and thereby facilitate communication with served UEs. Further, the wireless communication interface includes a transceiver 56 and power amplifier 58 supporting air interface communication according to the LTE protocol.

Controller 50, which may be integrated with wireless communication interface 48 or with one or more other components of the eNodeB, may then be configured to manage communication over the air interface, including managing the number of carriers in the UE's radio-link-layer connection (e.g., LTE connection) on which the base station provides service to the UE, in accordance with the present disclosure. By way of example, controller 44 may be configured to, while the base station is serving the UE over the radio-link-layer connection between the base station and the UE, (i) make a first determination of a PLMN to which the UE subscribes, (ii) based at least in part on the first determination of the PLMN to which the UE subscribes, make a second determination of a quantity of carriers on which to serve the UE, the quantity of carriers being at least one carrier, and (iii) based on the second determination, configure the radio-link-layer connection to encompass the determined quantity of carriers, so that the base station is then set to serve the UE on the determined quantity of carriers.

Controller 50 could be implemented using hardware, software, and/or firmware. For example, controller 50 could include one or more processors and a non-transitory computer readable medium (e.g., volatile and/or non-volatile memory) that stores machine language instructions or other executable instructions. The instructions, when executed by the one or more processors, may cause controller 50, and thus the eNodeB, to carry out the various base station operations described herein.

Exemplary embodiments have been described above. Those skilled in the art will understand, however, that changes and modifications may be made to these embodiments without departing from the true scope and spirit of the invention.

What is claimed is:

1. In a radio access network (RAN) in which a base station is configured to serve user equipment devices (UEs), a method comprising, while the base station is serving a UE:
    making a first determination of a public land mobile network (PLMN) to which the UE subscribes;
    based at least in part on the first determination of the PLMN to which the UE subscribes, making a second determination of how many carriers on which to serve the UE, wherein the determination of how many carriers is a determination of a quantity of carriers that is at least one carrier; and
    based on the second determination, configuring an air interface between the base station and the UE to encompass the determined quantity of carriers, whereby the base station is then set to serve the UE on the determined quantity of carriers.

2. The method of claim 1, wherein the determined quantity of carriers is multiple carriers, and
    wherein serving the UE on the determined quantity of carriers comprises providing the UE with carrier aggregation service concurrently on the multiple carriers.

3. The method of claim 1, wherein the determined quantity of carriers is multiple carriers, and
    wherein configuring the air interface between the base station and UE comprises (i) causing the base station to transmit to the UE a radio resource control (RRC) configuration message that specifies each carrier of the multiple carriers to notify the UE that air interface communication between the base station and the UE will occur on the specified multiple carriers, and (ii) updating a UE context record stored at the base station to indicate that the air interface encompasses the specified multiple carriers,
    whereby the base station is then set to provide the UE with carrier aggregation service concurrently on the specified multiple carriers.

4. The method of claim 1, wherein before configuring the air interface, the air interface encompasses at least one carrier on which the base station is serving the UE,
    wherein the determined quantity is one carrier, and
    wherein configuring the air interface to encompass the determined quantity of carriers comprises (i) selecting one particular carrier of the at least one carrier on which to continue to serve the UE and (ii) configuring the air interface to encompass only the selected carrier.

5. The method of claim 1, wherein the air interface defines a radio-link-layer connection between the base station and the UE,
    wherein configuring the air interface between the base station and the UE comprises configuring the radio-link-layer connection to encompass the determined quantity of carriers.

6. The method of claim 1, wherein making the second determination based at least in part on the first determination of the PLMN to which the UE subscribes comprises (i) determining whether the base station corresponds with the determined PLMN to which the UE subscribes, and (ii) based on the determining of whether the base station corresponds with the determined PLMN to which the UE subscribes, making the second determination of how many carriers on which to serve the UE.

7. The method of claim 6, wherein the base station is operated by a wireless service provider, and
    wherein determining whether the base station corresponds with the determined PLMN to which the UE subscribes comprises: (i) determining that the base station corresponds with the determined PLMN to which the UE subscribes if the UE subscribes to service provided by the wireless service provider, and (ii) determining that the base station does not correspond with the determined PLMN to which the UE subscribes if the UE does not subscribe to service provided by the wireless service provider.

8. The method of claim 6, wherein making the second determination based on the determining of whether the base station corresponds with the determined PLMN to which the UE subscribes comprises:
    if the base station corresponds with the determined PLMN to which the UE subscribes, responsively determining the quantity of carriers on which to serve the UE to be greater than one carrier, and
    if the base station does not correspond with the determined PLMN to which the UE subscribes, responsively determining the quantity of carriers on which to serve the UE to be just one carrier.

9. The method of claim 1, performed by at least one entity of the RAN selected from the group consisting of an evolved Node-B (eNodeB) and a mobility management entity (MME).

10. In a base station operable to serve a user equipment device (UE) over a radio-link-layer connection between the base station and the UE, a method comprising, while the base station is serving the UE through the radio-link-layer connection:
    making a first determination of a public land mobile network (PLMN) to which the UE subscribes;
    based at least in part on the first determination, making a second determination of whether the base station corresponds with the determined PLMN to which the UE subscribes;
    based at least in part on the second determination, making a third determination of how many carriers on which to serve the UE, wherein the determination of how many carriers is a determination of a quantity of carriers that is at least one carrier; and
    based on the third determination, configuring the radio-link-layer connection between the base station and the UE to encompass the determined quantity of carriers, whereby the base station is then set to serve the UE on the determined quantity of carriers.

11. The method of claim 10, wherein the base station is operated by a wireless service provider, and
    wherein making the second determination comprises: (i) determining that the base station corresponds with the determined PLMN to which the UE subscribes if the UE subscribes to service provided by the wireless service provider, and (ii) determining that the base station does not correspond with the determined PLMN to which the UE subscribes if the UE does not subscribe to service that is provided by the wireless service provider.

12. The method of claim 10, wherein making the third determination based at least in part on the second determination comprises:

if the base station corresponds with the determined PLMN to which the UE subscribes, responsively determining the quantity of carriers on which to serve the UE to be greater than one carrier, and if the base station does not correspond with the determined PLMN to which the UE subscribes, responsively determining the quantity of carriers on which to serve the UE to be just one carrier.

13. The method of claim 10, wherein the determined quantity of carriers is multiple carriers, wherein serving the UE on the determined quantity of carriers comprises providing the UE with carrier aggregation service concurrently on the multiple carriers, and wherein configuring the radio-link-layer connection between the base station and UE comprises (i) causing the base station to transmit to the UE a radio resource control (RRC) configuration message that specifies each carrier of the multiple carriers to notify the UE that air interface communication between the base station and the UE will occur on the specified multiple carriers, and (ii) updating a UE context record stored at the base station to indicate that the air interface connection encompasses the specified multiple carriers, whereby the base station is then set to provide the UE with carrier aggregation service concurrently on the specified multiple carriers.

14. The method of claim 10, wherein before configuring the radio-link-layer connection between the base station and the UE to encompass the determined quantity of carriers, the radio-link-layer encompasses at least one carrier on which the base station is serving the UE, wherein if the second determination is that the base station does not correspond with the determined PLMN to which the UE subscribes, then, based on the second determination, making the third determination to be that the quantity of carriers is one carrier, and wherein configuring the radio-link-layer connection to encompass the determined quantity of carriers comprises (i) selecting one particular carrier of the at least one carrier on which to continue to serve the UE and (ii) configuring the radio-link-layer connection to encompass only the selected carrier.

15. The method of claim 10, wherein at least the configuring of the radio-link-layer connection between the base station and the UE to encompass the determined quantity of carriers is performed in response to a determination by the base station that the base station is experiencing greater than a threshold extent of load on one or more carriers on which the base station is operable to serve UEs.

16. A base station comprising:

an antenna structure; and a controller operable to manage communication via the antenna structure, wherein the controller is configured to, while the base station is serving the UE over an air interface connection between the base station and the UE: (i) make a first determination of a public land mobile network (PLMN) to which the UE subscribes, (ii) based at least in part on the first determination of the PLMN to which the UE subscribes, make a second determination of how many carriers on which to serve the UE, wherein the determination of how many carriers is a determination of a quantity of carriers that is multiple carriers, and (iii) based on the second determination, configure the air interface connection to encompass the determined quantity of multiple carriers, whereby the base station then provides carrier aggregation service concurrently on the determined quantity of multiple carriers.

17. The base station of claim 16, wherein making the second determination based at least in part on the first determination of the PLMN to which the UE subscribes comprises (i) determining whether the base station corresponds with the determined PLMN to which the UE subscribes, and (ii) based on the determining of whether the base station corresponds with the determined PLMN to which the UE subscribes, making the second determination of how many carriers on which to serve the UE.

18. The base station of claim 17, wherein the base station is operated by a wireless service provider, and wherein determining whether the base station corresponds with the determined PLMN to which the UE subscribes comprises: (i) determining that the base station corresponds with the determined PLMN to which the UE subscribes if the UE subscribes to service provided by the wireless service provider, and (ii) determining that the base station does not correspond with the determined PLMN to which the UE subscribes if the UE does not subscribe to service that is provided by the wireless service provider.

19. The base station of claim 17, wherein making the second determination based on the determining of whether the base station corresponds with the determined PLMN to which the UE subscribes comprises:

if the base station corresponds with the determined PLMN to which the UE subscribes, responsively determining the quantity of carriers on which to serve the UE to be greater than two carriers, and if the base station does not correspond with the determined PLMN to which the UE subscribes, responsively determining the quantity of carriers on which to serve the UE to be just two carriers.

20. The base station of claim 16, wherein the air interface connection is a radio-link-layer connection between the base station and the UE, wherein configuring the air interface connection between the base station and UE comprises (i) causing the base station to transmit to the UE a radio resource control (RRC) configuration message that specifies each carrier of the determined quantity of multiple carriers to notify the UE that air interface communication between the base station and the UE will occur on the specified multiple carriers, and (ii) updating a UE context record stored at the base station to indicate that the radio-link-layer connection encompasses the specified multiple carriers, whereby the base station is then set to provide the UE with carrier aggregation service concurrently on the specified multiple carriers.

* * * * *